W. L. PARMENTER.
TRUCK OR THE LIKE.
APPLICATION FILED DEC. 18, 1916.

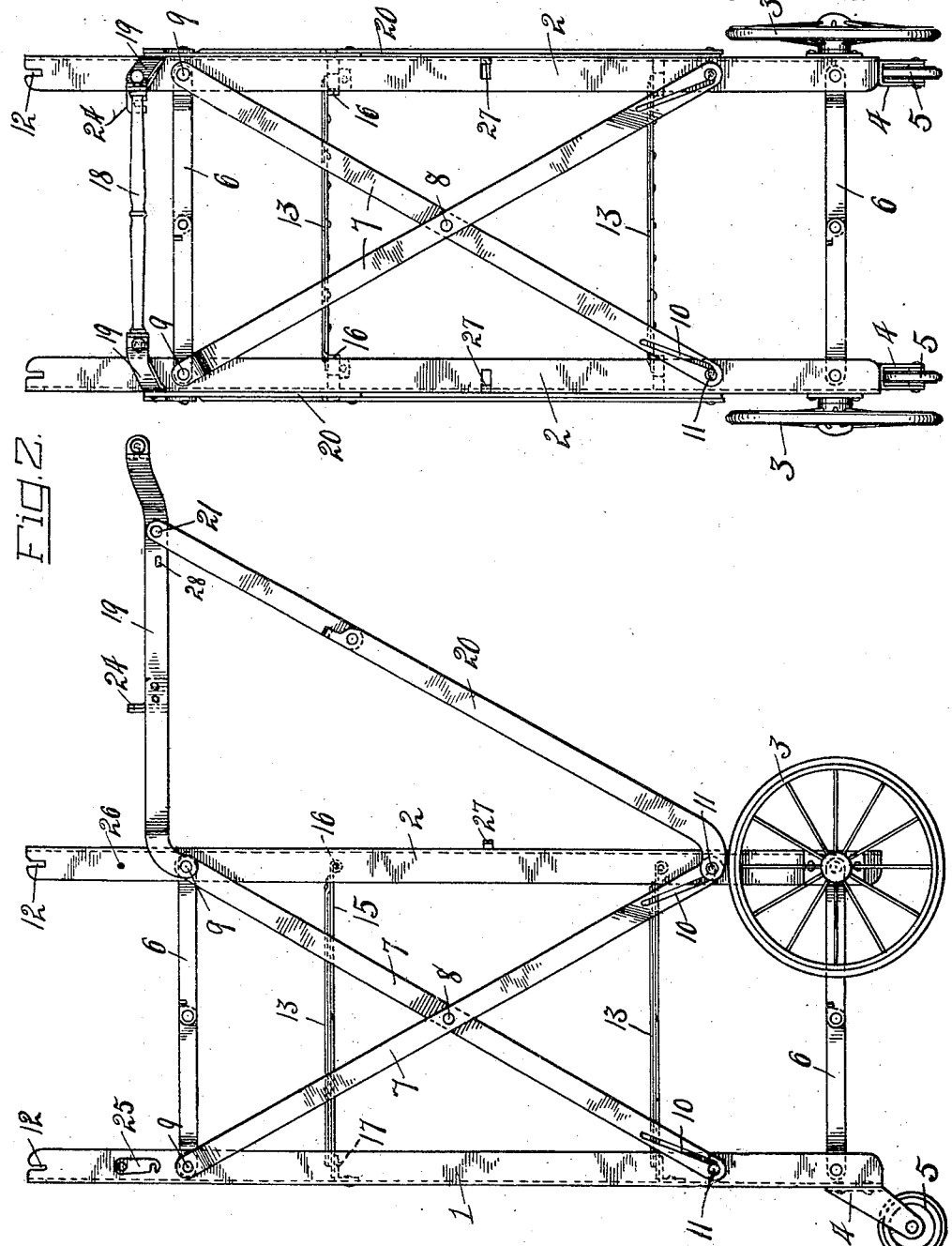

1,234,797.

Patented July 31, 1917.
3 SHEETS—SHEET 2.

INVENTOR
William L. Parmenter,
By Owen, Owen & Crampton,
His attys.

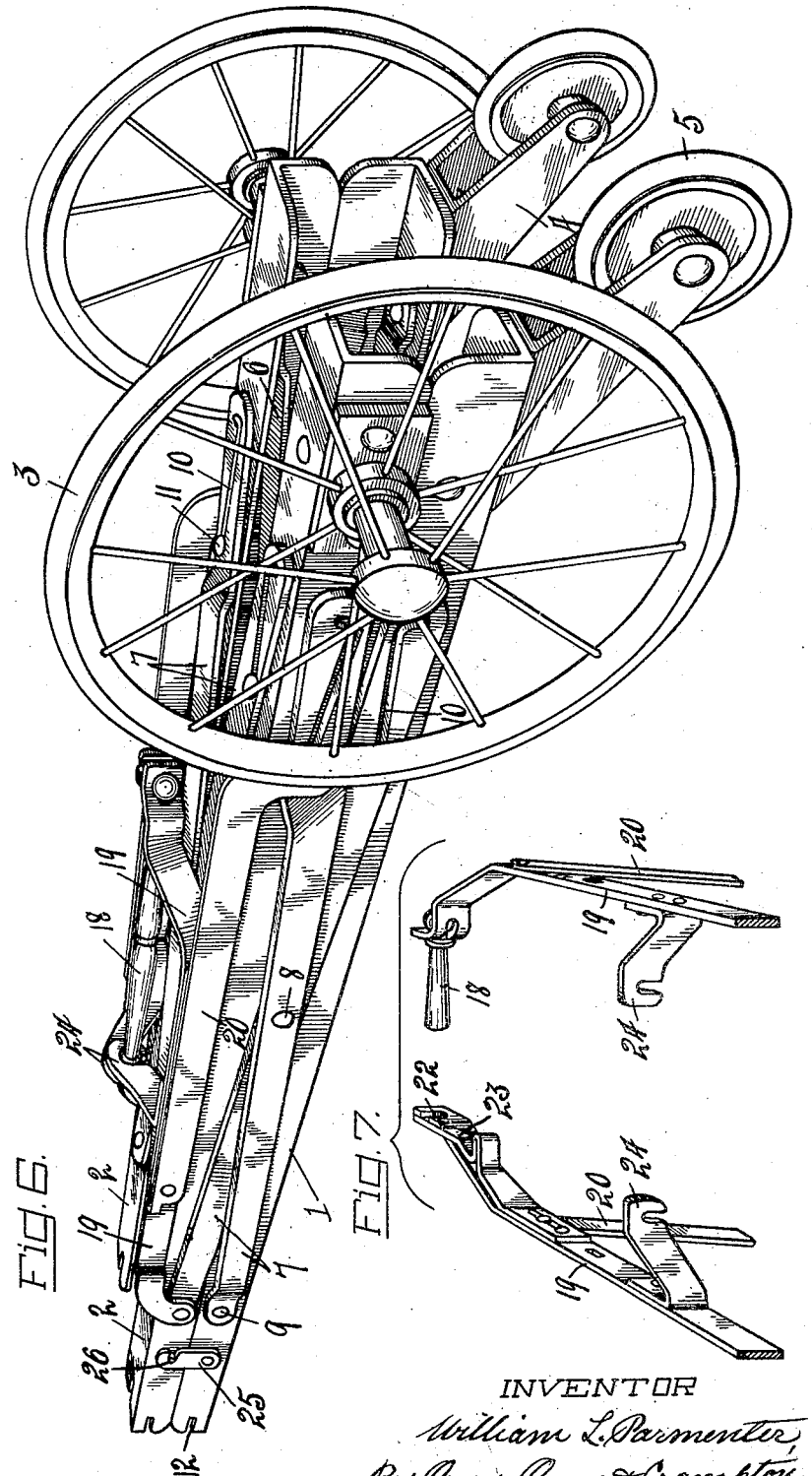

UNITED STATES PATENT OFFICE.

WILLIAM L. PARMENTER, OF LIMA, OHIO.

TRUCK OR THE LIKE.

1,234,797.      Specification of Letters Patent.      Patented July 31, 1917.

Application filed December 18, 1916. Serial No. 137,587.

*To all whom it may concern:*

Be it known that I, WILLIAM L. PARMENTER, a citizen of the United States, and a resident of Lima, in the county of Allen and State of Ohio, have invented a certain new and useful Truck or the like; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to small trucks and particularly to those of the hand propelled collapsible type.

The primary object of my invention is the provision of a truck of the character described adapted for use by mail carriers when taking out a heavy load of letters, papers, magazines or the like for distribution, and which may, when not in use, be compactly folded for storing or carrying as may be desired. Further objects and advantages of the invention will be apparent from the following detailed description thereof.

While the invention, in its broader aspect, is capable of embodiment in numerous forms, a preferred embodiment thereof is illustrated in the accompanying drawings, in which,—

Figure 3:
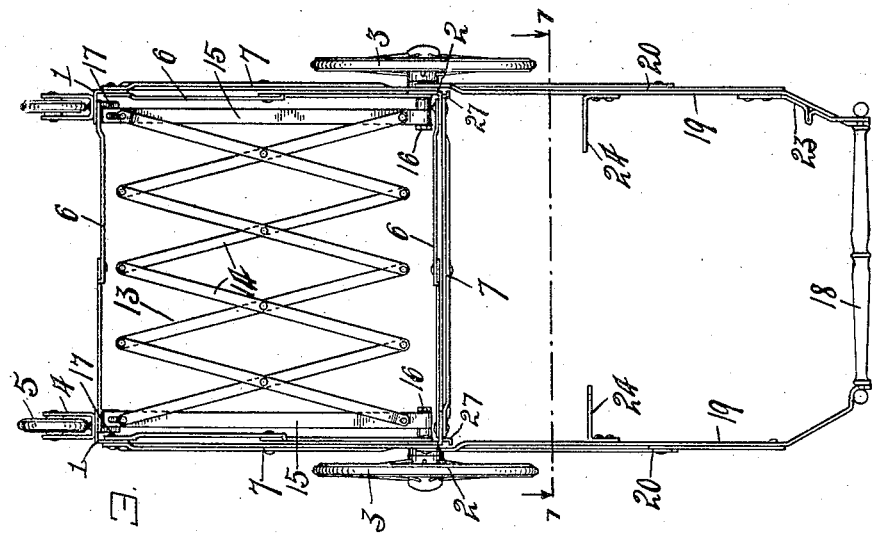
Figure 5:
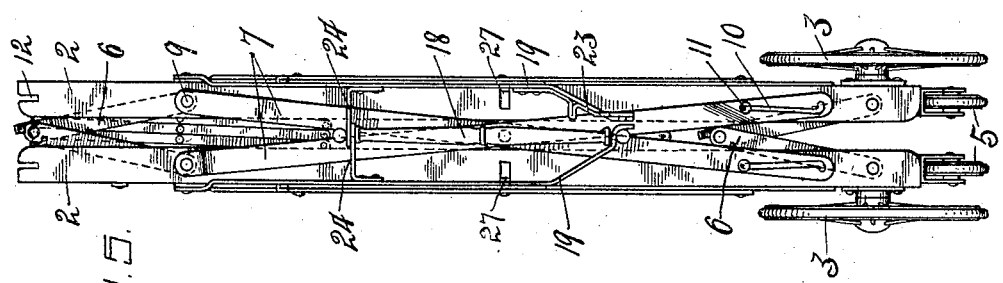
Figure 4:
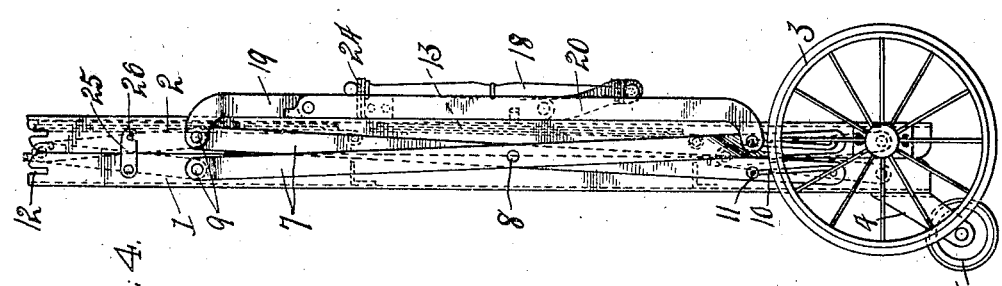

Figures 1, 2 and 3 are side, rear and top views, respectively, of a truck embodying the invention in open or set-up position. Figs. 4, 5 and 6 are side, rear and enlarged perspective views, respectively, of the truck in folded form, and Fig. 7 is a perspective view of the handle portion of the truck in set-up position with parts broken away.

Referring to the drawings, 1, 1 and 2, 2 designate the front and rear corner uprights of the truck, which uprights, in the present instance, are of angle iron with the channel thereof interiorly disposed. A wheel 3 is carried by each rear upright at the outer side of its lower end portion, while a fork 4 projects forward and downward from the lower end of each front upright and carries a small wheel 5. The uprights are connected adjacent to their upper and lower ends by side, front and rear bars 6, each of which is pivotally joined at its center to permit a breaking thereof and a relative collapsing or drawing together of the uprights connected thereby, as is apparent, thereby enabling the four uprights to be drawn together in substantially edgewise abutting relation or set up in truck forming position. The breaking movements of the bars 6 are in the longitudinal plane of the uprights connected thereby.

At each side and the rear of the truck frame is disposed a set of diagonally-crossed brace bars 7, 7, which are pivoted together at the point of crossing thereof, as at 8, and, in the present instance, have their upper ends pivoted to the respective pivots 9, which connect the outer ends of the adjacent upper cross-bar 6 to the uprights. The lower end of each bar 7 is provided with a longitudinally extending slot 10, the lower end of which is outwardly angled, as shown, and this slot receives a headed stud 11, which projects outward from the adjacent upright near its lower end. When the truck frame is in set-up or unfolded position, the studs 11 are disposed in the lower angled ends of the respective slots 10 so that the top wall of the angled portion of each shoulders against the stud and coöperates therewith to retain the frame in set-up position. Upon an outward springing of the lower ends of the bars 7 of each set, the longitudinally extending portions of the slots 10 are moved into register with the studs 11, thus permitting said studs to move upward in said slots as the frame uprights are drawn toward each other and the brace bars 7 of the sets are moved nearer to a parallel relation, as illustrated in Figs. 4, 5 and 6.

The upper end of the truck frame is intended to receive the mail bag of the carrier, the uprights 1 and 2 being suitably spaced for such purpose and the upper ends of these uprights are provided with notches 12 with which the strap, which customarily extends around the upper portion of the mail bag, may be engaged, thus supporting the bag in suspended relation within the truck frame.

The truck frame is provided in the lower portion thereof with one or more racks 13 on which magazines, parcel post packages, or the like, may be placed, these racks being so located as not to interfere with the hanging of a mail bag in the upper portion of the truck frame. In order that the racks 13 may remain firmly attached to the truck frame and be foldable therewith, each rack comprises a plurality of links 14, which are pivoted together in "lazy-tong" arrangement and carried at the outer ends by side bars 15, the rear ends of which bars are pivotally mounted on studs 16 projecting inward from the respective rear uprights 2, as best shown in Fig. 3. The forward ends of the bars 15 when in horizontal set-up position rest on brackets 17 projecting from the inner sides of the respective front uprights 1, 1 (Fig. 3). It is thus evident that each rack 13 may be swung upward and rearward on the pivot 16 to permit a relative drawing together or collapsing of the front uprights 1 with respect to the rear uprights 2 and that the "lazy-tong" construction of the rack will then permit a relative transverse collapsing or drawing together of the side uprights to place all four uprights in closely assembled relation.

The push handle 18 of the truck is carried at the rear ends of a pair of side arms 19 which project rearward from respective rear uprights 2, being carried, in the present instance, by the rear pivots 9 of the upper side bars 6. The arms 19 are supported in horizontal operative position by brace bars 20, which extend upward and rearward from the lower end portions of the respective rear uprights 2 and pivotally attach at their upper ends to the respective arms, as at 21. The bars 20 are preferably pivotally joined in a manner to permit an inward or forward breaking only thereof, thus permitting the said bars to be folded in parallel relation to the upright 2 to which attached, and enabling the arm 19 to be swung downward in parallel relation to its upright, as shown in Figs. 4, 5 and 6. In order to permit a relative drawing together of the arms 19 and bars 20, the handle 18 is swingingly attached to one arm 19, the left in the present instance, to adapt it to be swung into substantially parallel relation to such arm and the other end of the handle is adapted to be releasably engaged to the right hand arm 19. The handle is releasably attached to the arm 19, in the present instance, by having a restricted stem part at one end thereof seat in a notch 22 (Fig. 7) in said arm and is retained in this position by a slide tongue 23, which is slidingly carried by the arm and adapted to move to place a part thereof in closing engagement with respect to the outer end of the notch 22. When the truck frame and push arms 19 are in folded relation with the handle 18 disposed in parallel relation between said arms, the whole structure may be locked against transverse opening movements by hooked fingers 24, projecting inward from the respective arms 19, engaging the free end portion of the handle 18, as shown in Figs. 5 and 6. It is thus evident that the handle 18 is utilized in conjunction with the fingers 24 to retain the parts in transversely folded relation. A forward unfolding of the frame uprights is prevented by hooks 25 being carried at each side by one upright and having hooked engagement with a pin 26 on the other upright at the same side, as shown in Figs. 4 and 6.

The handle carrying arms 19 and brace bars 20 are retained in folded relation to the uprights 2, 2 by hooked fingers 27 on the uprights engaging within registering apertures 28 in the respective arms 19. In engaging the hooks 27 with the apertures 28, it is necessary to spring the arms 19 slightly outward, and the arms are then drawn inward and held in locked engagement with the fingers 27 by the engagement of the fingers 24 with the handle 18, as above described. When the parts are locked in folded relation, the handle 18 may serve as a handle for carrying the truck.

It is evident that I have provided a simple and efficient form of truck which is strong and durable in its construction and capable of being utilized to carry a mail bag, books, papers or other articles and is capable of being compactly folded in an easy and rapid manner to facilitate a storing of the truck or a carrying of the same by the operator when not in use.

I wish it understood that my invention is not limited to any specific construction, arrangement or form of the parts as it is capable of numerous modifications and changes without departing from the spirit of the claims.

Having thus described my invention, what I claim as new, and desire to secure by Letters Patent, is,—

1. A wheeled frame having four corner uprights, means connecting said uprights and operable to retain the same in unfolded set-up relation or to permit a folding thereof each with respect to the others, and a push handle attached to said frame for folding movements therewith and with respect thereto.

2. The combination with a wheeled frame having a pair of transversely spaced rear uprights foldably connected for folding and unfolding movements toward and away from each other in combination with push means projecting rearward from said uprights and operable to fold in close substantially parallel relation thereto and transversely therewith.

3. The combination with a wheeled frame having a pair of rear uprights connected for relative transverse folding and unfolding movements, of an arm pivotally projecting rearward from each upright, a jointed brace bar pivotally projecting upward and rearward from each upright and adapted to support the respective arm, said arms and bars being foldable with respect to the uprights, and a handle releasably connecting the outer ends of said arms to permit relative transverse movements of the arms and brace bars with the respective uprights when relatively folded or unfolded.

4. The combination with a wheeled frame having a pair of rear uprights connected for relative transverse folding and unfolding movements, of an arm pivotally projecting rearward from each upright, a jointed brace bar pivotally projecting upward and rearward from each upright and adapted to support the respective arm, said arms and bars being foldable with respect to the uprights, a handle releasably connecting the outer ends of said arms to permit relative transverse movements of the arms and brace bars with the respective uprights when relatively folded or unfolded, and means carried by said arms and coöperating with the handle to retain the different parts in folded relation.

5. The combination with a wheeled frame having a plurality of uprights connected for relative folding and unfolding movements, of arms pivotally projecting rearward from said frame and foldable thereagainst in substantially parallel relation to the uprights and capable of folding movements toward and away from each other with the upright, a handle swingingly connected at one end to one of said arms and releasably connected at its other end to the other of said arms and capable of being swung in substantially parallel relation to the arms between the same, and means projecting from the respective arms and engaging said handle to coöperate therewith to retain said arms and the uprights to which attached in folded relation.

6. A frame having a plurality of corner uprights, means connecting said uprights for relative folding and unfolding movements each with respect to the other and shelves foldably connected to said uprights.

7. A frame having a plurality of corner uprights, means connecting said uprights for relative folding and unfolding movements, and a rack foldably carried by said uprights and being of foldable "lazy-tong" construction.

8. A frame having four corner uprights, means connecting said uprights to permit relative folding and unfolding movements thereof each with respect to the others and a rack pivoted to a portion of said uprights and adapted to stand in article supporting position when the frame is in unfolded position and capable of being swung into substantially parallel relation to the uprights and to have collapsing movements when the uprights are drawn together in folded relation.

9. A frame having four corner uprights, means connecting said uprights to adapt them to be relatively folded and unfolded each with respect to the others whereby all of the uprights may be placed in closed parallel relation, a rack carried by said frame and supported in operative position by said uprights, said rack being pivoted to two of said uprights to be swung into parallel relation therewith and being transversely collapsible to permit a relative folding or unfolding of the uprights to which pivoted.

In testimony whereof, I have hereunto subscribed my name to this specification.

WILLIAM L. PARMENTER.

Copies of this patent may be obtained for five cents each, by addressing the "Commissioner of Patents, Washington, D. C."